(12) United States Patent
Niehorster et al.

(10) Patent No.: US 8,016,082 B2
(45) Date of Patent: Sep. 13, 2011

(54) DISC BRAKE OPERATING MECHANISM

(75) Inventors: Keith Niehorster, South Glamorgan (GB); Kishan Kumar Udupi, Karnataka (IN); Rajaram Kumble, Karnataka (IN); Paul Roberts, Newport (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 1166 days.

(21) Appl. No.: 11/744,256

(22) Filed: May 4, 2007

(65) Prior Publication Data

US 2007/0256902 A1 Nov. 8, 2007

(30) Foreign Application Priority Data

May 5, 2006 (GB) .................................. 0608955.1

(51) Int. Cl.
*F16D 55/08* (2006.01)
(52) U.S. Cl. ...................... 188/72.9; 188/72.7
(58) Field of Classification Search ............... 188/72.9, 188/72.7
See application file for complete search history.

(56) References Cited

U.S. PATENT DOCUMENTS

| | | | | |
|---|---|---|---|---|
| 3,507,367 A | * | 4/1970 | Brown et al. | 188/106 F |
| 4,809,822 A | * | 3/1989 | Margetts | 188/72.7 |
| 5,000,294 A | * | 3/1991 | Hunnicutt et al. | 188/71.9 |
| 5,664,646 A | * | 9/1997 | Bejot et al. | 188/71.9 |
| 5,720,366 A | | 2/1998 | Guasch et al. | |
| 5,819,884 A | * | 10/1998 | Giering | 188/71.9 |
| 2001/0030090 A1 | * | 10/2001 | Thomas et al. | 188/72.9 |

FOREIGN PATENT DOCUMENTS

| | | |
|---|---|---|
| DE | 10 2004 042576 | 3/2006 |
| EP | 0 260 934 | 3/1988 |
| EP | 0566006 | 4/1993 |
| WO | 95/19511 | 7/1995 |
| WO | 96/36819 | 11/1996 |
| WO | 2004/074705 | 9/2004 |

OTHER PUBLICATIONS

United Kingdom Search Report dated Aug. 30, 2006.
Extended European Search Report dated Jul. 31, 2009.

* cited by examiner

*Primary Examiner* — Bradley King
*Assistant Examiner* — Mahbubur Rashid
(74) *Attorney, Agent, or Firm* — Carlson, Gaskey & Olds, PC

(57) ABSTRACT

An actuating lever of a brake caliper of a vehicle includes a cam surface operable against a single tappet and reacting against a caliper bridge. The actuating lever includes a wear adjuster arm which exerts a turning moment on the actuating lever. The turning moment is resisted by a small stub axle pivotable in a plain bearing of the brake caliper.

20 Claims, 5 Drawing Sheets

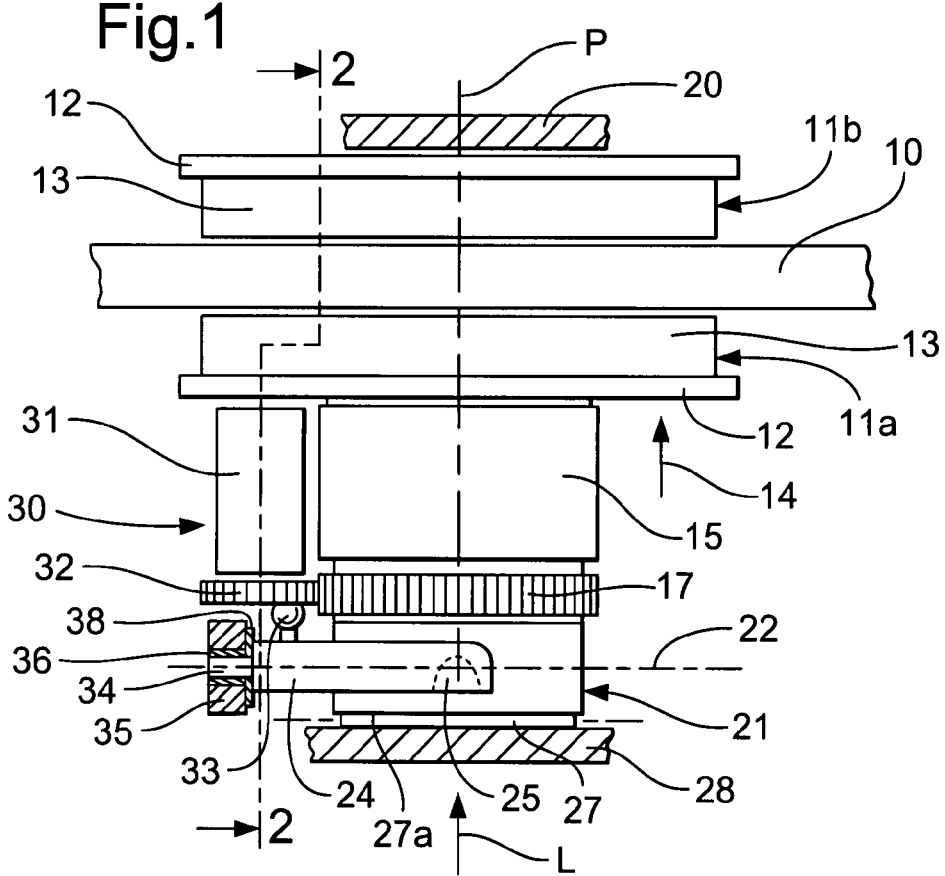
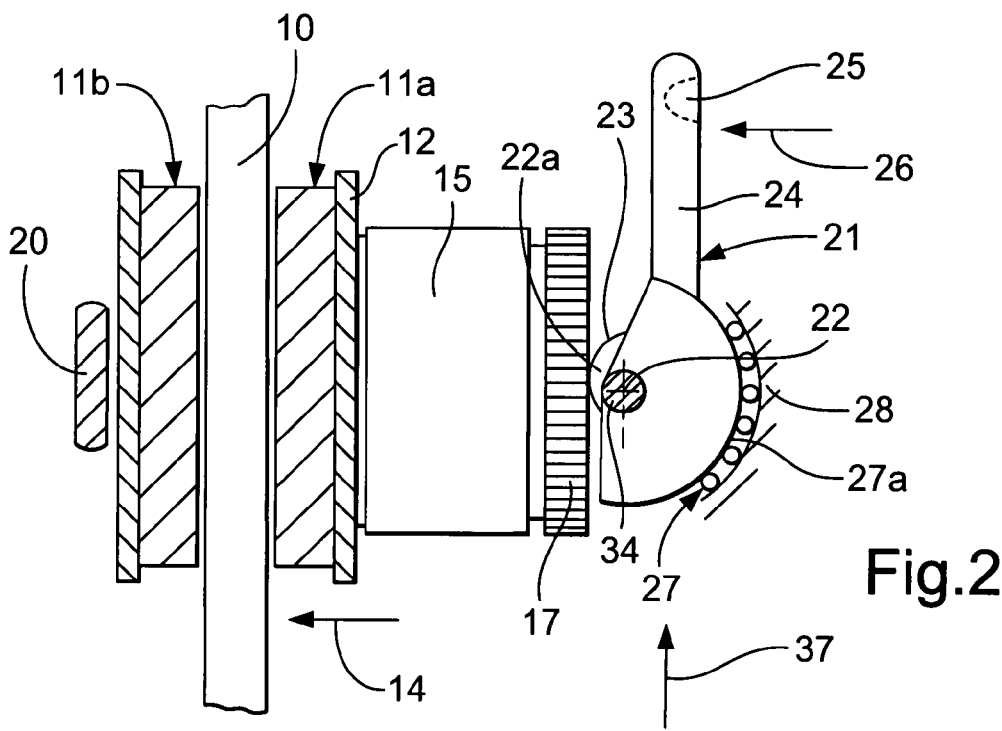

DISC BRAKE OPERATING MECHANISM

REFERENCE TO RELATED APPLICATIONS

This application claims priority to United Kingdom Patent Application No. GB 0608955.1 filed on May 5, 2006.

BACKGROUND OF THE INVENTION

This invention relates generally to a disc brake operating mechanism and particularly to a mechanism for a disc brake of a truck.

Braking systems of heavy trucks generally use air under pressure as an operating medium. Typically, large air actuators have a mechanical output which applies brake pads to a brake rotor via a lever mechanism. The lever mechanism includes an operating shaft pivotable about an axis to urge one or more tappets against a brake pad via a cam surface. The operating shaft has a lever arm acted upon by the air actuator and may include another generally shorter arm to actuate a wear adjuster. For larger brake pads, twin tappets are provided to optimize pressure distribution on a brake pad backplate.

Typically, a lever mechanism will include an operating shaft extending on a pivot axis on either side of a brake actuator lever. Bearings (usually needle rollers) are provided on each side of the brake actuator lever to resist brake application force and to permit the operating shaft to pivot freely. Twin bearings obviate twisting and end loads on the operating shaft. Typically, the bearings provided on each side of the brake actuator lever sit in saddle components fitted into a brake housing. The saddle components often provide axial retention of the bearing arrangements. The addition of saddle components increases part count, complexity of assembly and cost.

For smaller brake pads, a single tappet is sufficient, but nevertheless twin bearings are provided. This arrangement adds to the cost and weight of the brake, and also results in problems in packaging the components within a smaller brake envelope because space at an inboard side of the brake rotor is limited.

A solution to these problems which permits easier packaging, yet allows both weight and cost to be reduced, is needed.

SUMMARY OF THE INVENTION

According to a first aspect of the invention, there is provided an operating lever of a disc brake caliper. The operating lever is adapted for pivoting movement in the brake caliper to transfer an actuating force from a brake actuator to a brake pad. The operating lever includes a shaft having a pivot axis. A cam surface is on the operating shaft at one end of the operating lever and is operable on pivoting of the operating lever. A lever arm extends from the shaft intermediate the ends of the shaft and extends over the cam surface. A wear adjuster arm extends from the operating lever, and a stub axle on the axis is at the other end of the operating lever. The operating lever has a bearing surface adapted for reactive support of the cam surface on a roller element bearing of a brake caliper. The stub axle is adapted for support in a plain bush of a brake caliper. A diameter of the stub axle is less than a radius of the bearing surface.

The operating lever is essentially single sided and thus has a single cam surface associated with a single brake tappet. The operating lever is thus smaller than prior art proposals having roller element bearing support at both sides. The cylindrical stub axle is relatively small, yet sufficient to resist a turning movement as a result of operation of the wear adjuster arm. The stub axle has a diameter typically in the range 20-40% of the effective diameter of the roller element bearing.

In one example, the operating lever has a first side on which the cam surface and the wear adjuster arm are provided and a second side on which the bearing surface is provided. The first side and the second side are substantially opposite.

In one embodiment, the wear adjuster arm extends from the shaft substantially at right angles to a direction of extension of the lever arm. A free end of the lever arm is orthogonal to the axis of the lever and over the mid point of the cam surface. The operating lever further includes an annular bearing housing having a plain bush adapted to the stub axle. In one embodiment, the cam surface is at one side of said lever arm, and the stub axle is at the other side.

According to a second aspect of the invention, there is provided a brake caliper including a housing having a tappet slidable in the housing and a bridge adapted to straddle a brake rotor and slidable with respect to the housing in a direction of a brake rotor axis. The brake caliper further including a lever according to the first aspect operably situated between the tappet and the bridge. A stub axle and bearing surface are supported by the bridge. The bridge may be a one piece component or an assembly including a housing and a bridge member operatively fixed to the housing.

In one embodiment, an axial center of the cam surface is substantially co-incident with the axis of the tappet. The tappet includes a toothed adjuster wheel screw threaded to the tappet on the tappet axis and directly operable by the cam surface. In one embodiment, the caliper further includes a wear adjuster immediately adjacent the tappet and having a toothed wheel in engagement with the adjuster wheel, the axes of the wheels being parallel. The toothed wheel of the wear adjuster is constrained to rotate uni-directionally in response to motion of the wear adjuster arm.

BRIEF DESCRIPTION OF THE DRAWINGS

Other features of the invention will be apparent from the following description of a preferred embodiment of the invention in which:

FIG. 1 is a schematic plan view of a first embodiment of a single tappet brake applicator according to the invention;

FIG. 2 is a cross-sectional view on line 2-2 of FIG. 1;

DETAILED DESCRIPTION OF THE PREFERRED EMBODIMENT

Figure 3:
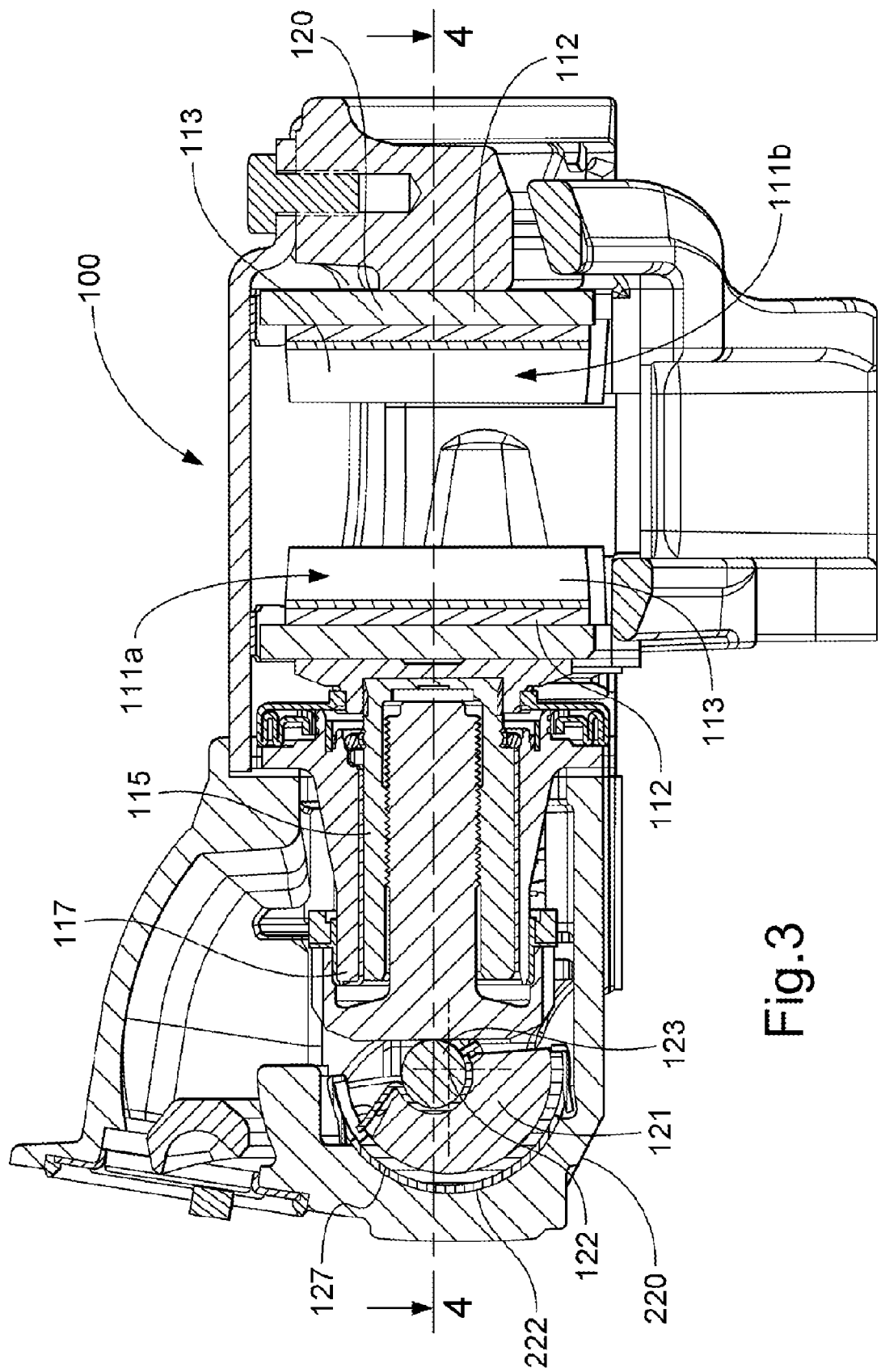
FIG. 3 is a cross-sectional view of a second embodiment of a single tappet brake applicator according to the invention.

FIGS. 1 and 2 illustrate schematically an operating mechanism of a single tappet brake applicator suitable for a commercial vehicle, typically a light commercial vehicle.

An inboard brake pad 11a includes a backing plate 12 and a layer of friction material 13. The inboard brake pad 11a is movable in the direction of an arrow 14 against a corresponding brake rotor 10. A feature 20 is provided to urge an outboard brake pad 11b against an opposite side of the brake rotor 10. The feature 20 usually includes a bridge which spans the brake rotor 10 and is slidably mounted on a carrier to transmit a reaction force from an inboard operating lever.

An inboard mechanism includes a single brake tappet 15 slidable in the direction of the arrow 14 relative to the brake rotor 10. Screw threaded to the brake tappet 15 on an axis is a toothed adjuster wheel 17. Relative rotation of the adjuster wheel 17 and the brake tappet 15 assembly in one direction causes lengthening of the brake tappet 15, and thus compensation for a reduction in thickness of the friction material 13 due to wear.

In order to urge the tappet assembly in the direction of the arrow 14, a lever 21 is pivoted about a transverse axis 22 in the brake housing. The lever 21 has a cam surface 23 extending across a face of the brake tappet 15 and an arm 24 having a pocket 25 adapted to receive an output rod (not shown) of a brake actuator. The arm 24 curves over the cam surface 23 so that in plan (FIG. 1), the line of action from the brake actuator (via the pocket 25) is substantially over the line of action of the tappet assembly. The cam surface 23 may include a roller bearing 22*a* offset from the transverse axis 22 (as depicted) or may be plain.

Application of a force in the direction of an arrow 26 (FIG. 2) causes arcuate movement of the lever 21, and thus the cam surface 23 bears on the tappet assembly to urge the inboard brake pad 11*a* directly against the brake rotor 10.

Reaction force from the lever 21 is supported directly on a bearing surface 27*a* acting on a row of needle rollers 27, which in turn are supported by, e.g., a reaction bridge 28 or saddle component, and thus by the outboard brake pad 11*b*, which is urged against the brake rotor 10.

A wear adjuster 30 includes a body 31 having a rotatable toothed wheel 32 in engagement with the adjuster wheel 17.

An operating arm 33 (omitted from FIG. 2) of the lever 21 is engageable with the wear adjuster 30 to urge rotation of the toothed wheel 32 on each arcuate movement of the lever 21 in the event that adjustment is required. A suitable ratchet mechanism or clutch mechanism permits movement of the toothed wheel 32 in one direction only so that the adjuster wheel 17 is rotated as the friction material wears away, and the tappet assembly is progressively lengthened. Such ratchet adjuster mechanisms are well known and need not be further described here.

As shown in FIG. 1, the lever 21 has a first (or front side) on which the cam surface 23 and the wear adjuster operating arm 33 are provided, and a second (or rear side) on which the bearing surface 27*a* is provided. The first side and the second side are substantially opposite. More specifically, the first side is proximate the inboard brake pad 11*a*, and the second side is distant from the inboard brake pad 11*a*.

The lever 21 is arranged at one side and over the tappet assembly and the needle rollers 27. Accordingly, there may be some loss of stability on end loading of the lever 21 because the line of action of the actuator is offset from the line of action of the tappet assembly.

Furthermore, the force exerted by the wear adjuster operating arm 33 of the adjuster also exerts a turning (lifting) moment on the lever 21, which is in the direction of an arrow 37 (FIG. 2).

To counter this turning moment and stabilize the lever 21, a cylindrical extension 34 (also known as a stub axle) of the lever 21 projects on the transverse axis 22 and is supported in a bearing block 35 by a plain bush 36. The bearing block 35 is mounted on or forms part of, e.g., the reaction bridge 28, and is stationary relative to the tappet assembly. The cylindrical extension 34 is centred on the transverse axis 22 as shown in FIG. 2.

The loads resisted by the bush 36 are small, and thus the dimensions of the bush 36 can also be small. For example, a diameter of the partial needle roller set may be between 2 and 5 times a diameter of the bush 36.

Thus, the bush 36 supports relatively small loads generally orthogonal to the plane illustrated in FIG. 1 (i.e., vertical with respect to FIG. 2), whereas the needle rollers 27 bear the considerable lateral loads exerted by the lever 21.

Axial loads may be supported in any conventional manner, for example by a thrust washer 38. The thrust washer 38 and the bush 36 may be combined and pressed into the bearing block 35 from the right when viewing FIG. 1.

The arrangement is considerably simplified compared with a double sided needle roller arrangement, not least because forces generated by the wear adjuster operating arm 33 are resisted independently from those of the lever 21. Accordingly, the corresponding bearings can be sized according to the required duty, and the arrangement is not compromised by providing needle rollers 27 on the adjuster arm side. Weight is reduced, and less space is occupied.

A further advantage is that the needle rollers 27 need only be provided in an arc substantially as illustrated in FIG. 2, i.e., with little capacity to resist loading in the vertical direction because tappet assembly loads are generally horizontal. The necessary resistance to vertical loading can be provided by the bush 36 alone. This arrangement allows a further saving of space and cost.

Referring now to the embodiment in FIGS. 3 to 6, a single tappet brake applicator 100 suitable for a commercial vehicle, typically a light commercial vehicle, is shown and is substantially similar to the applicator hereinbefore described. Common features are the same, numbered 100 greater.

Figure 6:
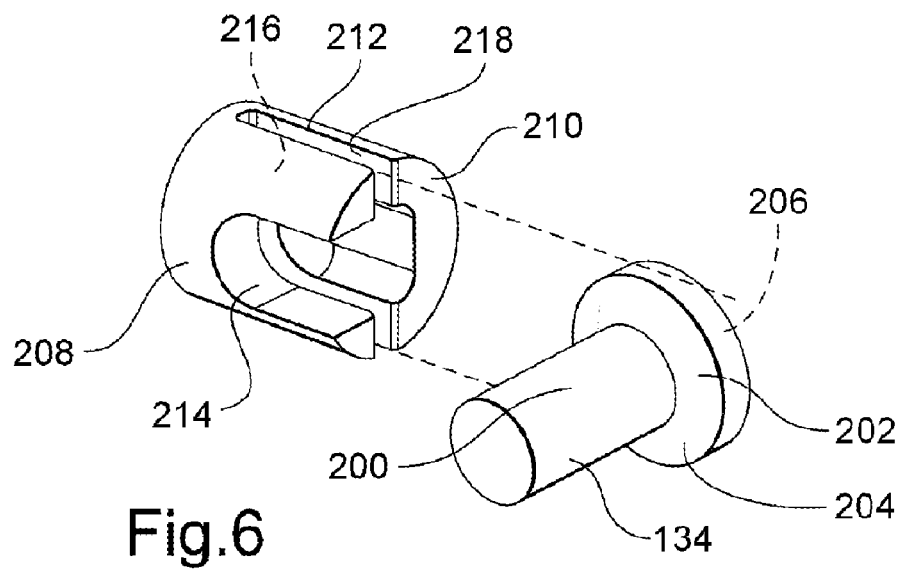
FIG. 6 is a detailed view of the thrust bush of FIG. 3.

An applicator 100 includes an extension 134 similar to the cylindrical extension 34, and the extension 134 includes a first cylindrical portion 200. The applicator 100 further includes a second cylindrical portion 202, as shown in FIG. 6. The second cylindrical portion 202 has a diameter substantially greater than a diameter of the first cylindrical portion 200, and the main part of the lever arm 121 is omitted in FIG. 6 for clarity. Note that the first cylindrical portion 200 and the second cylindrical portion 202 may be integral or separate components.

The applicator 100 therefore includes a first extension surface 204 defined by an annular shoulder between the first cylindrical portion 200 and the second cylindrical portion 202. The applicator 100 further includes a second extension surface 206 defined on a side of the second cylindrical portion 202 opposite to the first extension surface 204.

The applicator 100 further includes a thrust bush 208 including a substantially cylindrical body 210 with a blind slot 212 through the cylindrical body 210. The blind slot 212 is defined by a first thrust bush surface 216 and a second thrust bush surface 218. The thrust bush 208 further includes an entry orifice 214.

Figure 4:
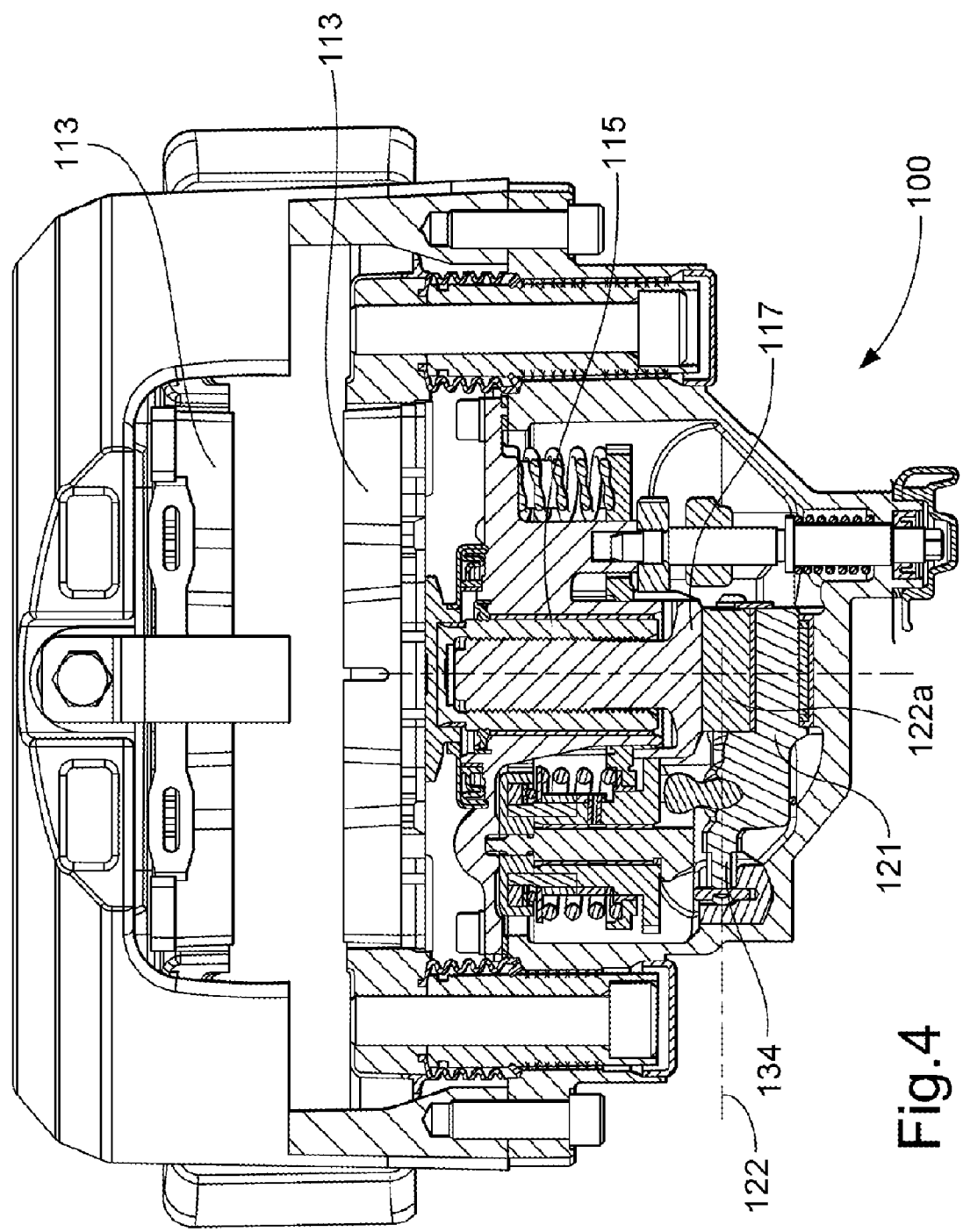
FIG. 4 is a cross-sectional view on line 4-4 of FIG. 3.
Figure 5:
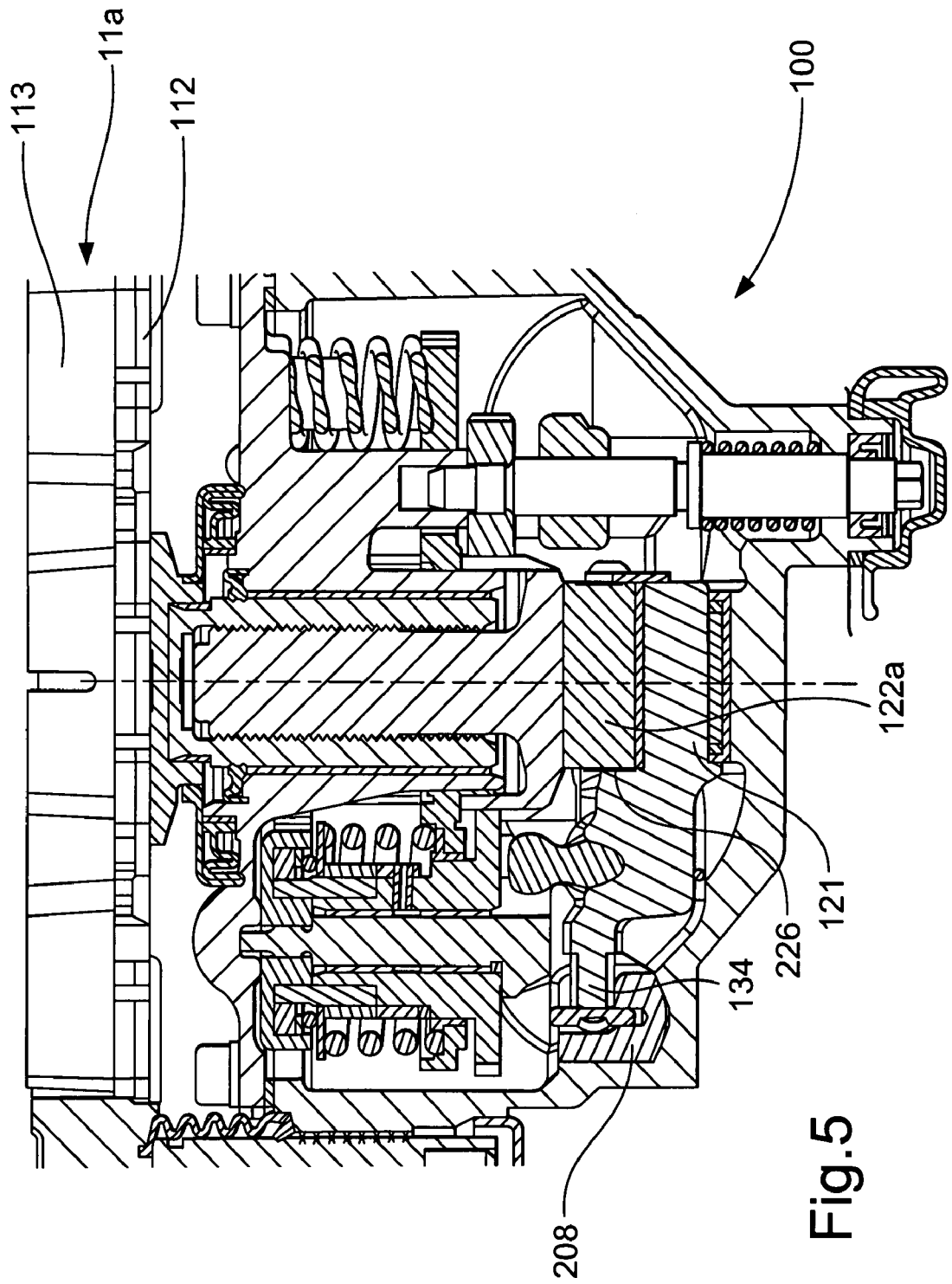
FIG. 5 is a detailed view of a part of the single tappet brake applicator of FIG. 4.

The thrust bush 208 is configured to be mounted into the brake caliper, as shown in FIG. 5. In use, the first cylindrical portion 200 and the second cylindrical portion 202 sit in the thrust bush 208, as shown in FIGS. 3 to 5. The first extension surface 204 abuts the first thrust bush surface 216, and the second extension surface 206 abuts the second thrust bush surface 218. As the thrust bush 208 is mounted in the caliper, the interaction of these surfaces therefore provides a restraint on the lever 121 in both directions of an axis 122.

The first cylindrical portion 200 bears against the curved end of entry orifice 214 and reacts the relatively small loads generally orthogonal to the plane illustrated in FIG. 4 (i.e., vertical with respect to FIG. 3) in a manner similar to the cylindrical extension 34.

Referring to FIG. 3, a caliper body 220 of applicator 100 includes a semicircular section recess 222 to receive roller bearing 127. Traditionally, the recess 222 is provided with a separate saddle component bolted or otherwise fixed to the caliper housing 220. Features of the saddle act to axially restrain the lever 121 in the directions of the axis 122. However, as the lever 121 is restrained by the features of extension 134, axial restraint is not required, and the saddle component may be disposed with.

Therefore, other manufacturing techniques, such as the use of ball-nosed cutters, may be employed to form recess 222 as the axial restraint provided by the substantially flat end resulting from a traditional cutter (for example, a cylindrical tool) is not required.

Figure 7:
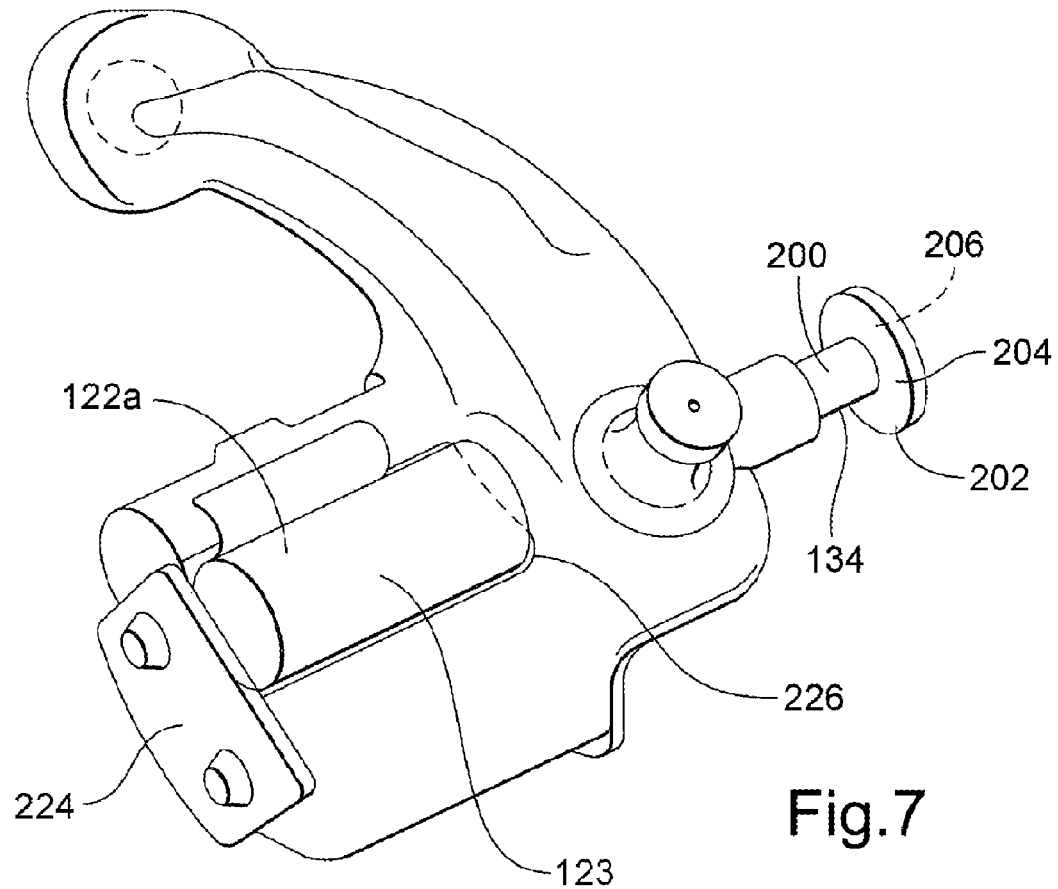
FIG. 7 is a perspective view of the lever of FIG. 3.

When the cam surface 123 is defined by a roller bearing 122a, a plate 224 can be fixed to an end of the lever 121 as shown in FIG. 7. This plate in conjunction with a shoulder 226 of the lever 121 prevents the roller moving axially relative to the lever 121.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An operating lever of a disc brake caliper, the operating lever being adapted for pivoting movement in the disc brake caliper to transfer an actuating force from a brake actuator to a brake pad, the operating lever comprising:
   a shaft having a shaft pivot axis;
   a cam surface on the shaft at a first end of the operating lever and operable on pivoting of the operating lever;
   a lever arm extending from the shaft, intermediate ends of the shaft and extending over the cam surface;
   a wear adjuster arm extending from the operating lever; and
   a stub axle at a second end of the operating lever,
   wherein the operating lever has a bearing surface adapted for reactive support of the cam surface on a roller element bearing of the disc brake caliper, the stub axle adapted to be supported in a plain bush of the disc brake caliper, a diameter of the stub axle is less than a radius of the bearing surface, and the bearing surface defines the shaft pivot axis and the diameter defines a stub axle pivot axis, the stub axle pivot axis being coincident with the shaft pivot axis.

2. The operating lever according to claim 1 wherein the diameter of the stub axle is 40-80% of the radius of the bearing surface.

3. The operating lever according to claim 1 wherein the stub axle protrudes from a surface that is orthogonal to the shaft pivot axis and defines an annular thrust face of the operating lever.

4. The operating lever according to claim 1 wherein the bearing surface extends over 180° or less of a circumference of the operating shaft.

5. The operating lever according to claim 1 wherein the lever arm extends substantially at a right angle to the wear adjuster arm.

6. The operating lever according to claim 1 wherein the wear adjuster arm and the cam surface are at opposite axial sides of the lever arm.

7. The operating lever according to claim 1 wherein the bearing surface is at a first side of the operating shaft, the cam surface and the wear adjuster arm are at a second side of the operating shaft, and the second side is substantially opposite to the first side.

8. The operating lever according to claim 1 wherein the stub axle includes a first stub axle surface configured to prevent movement of the operating lever in a first axial direction of the shaft pivot axis.

9. The operating lever according to claim 8 wherein the stub axle includes a second stub axle surface configured to prevent movement of the operating lever in a second axial direction of the shaft pivot axis, and the second axial direction is substantially opposite to the first axial direction.

10. The operating lever according to claim 8 wherein the stub axle includes a first cylindrical portion and a second cylindrical portion, the first cylindrical portion has a diameter substantially less than a diameter of the second cylindrical portion, and the first stub axle surface is defined as a shoulder between the first cylindrical portion and the second cylindrical portion.

11. The operating lever according to claim 10 wherein the first cylindrical portion is closer to the cam surface than the second cylindrical portion.

12. The operating lever as defined in claim 1 wherein the stub axle is adapted for reactive support of the cam surface in the plain bush.

13. A brake caliper comprising:
   a plain bush for a stub axle; and
   an operating lever being adapted for pivoting movement in a disc brake caliper to transfer an actuating force from a brake actuator to a brake pad, the operating lever including:
   a shaft having a shaft pivot axis,
   a cam surface on the shaft at a first end of the operating lever and operable on pivoting of the operating lever,
   a lever arm extending from the shaft, intermediate ends of the shaft and extending over the cam surface,
   a wear adjuster arm extending from the operating lever, and
   the stub axle at a second end of the operating lever, wherein the operating lever has a bearing surface adapted for reactive support of the cam surface on a roller element bearing of a disc brake caliper, the stub axle adapted to be supported in the plain bush of a brake caliper, a diameter of the stub axle is less than a radius of the bearing surface, and the bearing surface defines the shaft pivot axis and the diameter defines a stub axle pivot axis, the stub axle pivot axis being coincident with the shaft pivot axis.

14. The brake caliper according to claim 13 wherein one end of the plain bush includes an annular thrust face.

15. The brake caliper according to claim 13 wherein the plain bush is a thrust bush including a first thrust bush surface configured to prevent movement of the operating lever in a first axial direction of the shaft pivot axis.

16. The brake caliper according to claim 15 wherein the thrust bush includes a second bush surface configured to prevent movement of the operating lever in a second axial direction of the shaft pivot axis, and the second direction is substantially opposite to the first axial direction.

17. The operating lever according to claim 1 wherein the stub axle is fixed relative to the operating lever.

18. The operating lever according to claim 1 wherein the stub axle projects on the shaft pivot axis and is supported in a bearing block by the plain bush, and the bearing block is mounted on or forms part of a reaction bridge and is stationary relative to a tappet assembly.

19. The brake caliper according to claim 13 wherein the stub axle projects on the shaft pivot axis and is supported in a bearing block by the plain bush, and the bearing block is mounted on or forms part of a reaction bridge and is stationary relative to a tappet assembly.

20. The brake caliper as defined in claim 13 wherein the stub axle is adapted for reactive support of the cam surface in the plain bush.

* * * * *